United States Patent [19]
Josephy et al.

[11] Patent Number: 5,102,737
[45] Date of Patent: Apr. 7, 1992

[54] PRINT RECEIVING COATINGS

[75] Inventors: Karl Josephy, Los Angeles; George Q. Moses, Glendora; Elisea Amba, Pomona, all of Calif.; Bruce D. Morrison, Buffalo, N.Y.

[73] Assignee: Avery Dennison Corporation, Pasadena, Calif.

[21] Appl. No.: 535,180

[22] Filed: Jun. 8, 1990

Related U.S. Application Data

[63] Continuation-in-part of Ser. No. 364,793, Jun. 9, 1989, abandoned.

[51] Int. Cl.⁵ .............................. B32B 9/00
[52] U.S. Cl. ...................... 428/411.1; 428/195; 428/413; 428/423.1; 428/500; 428/913; 346/1.1
[58] Field of Search .................. 346/1.1, 135.1; 428/195, 411.1, 413, 423.1, 500, 913

[56] References Cited

U.S. PATENT DOCUMENTS

| | | | |
|---|---|---|---|
| 4,177,314 | 12/1979 | Steeves | 428/336 |
| 4,267,556 | 5/1981 | Fotland et al. | 346/153.1 |
| 4,337,303 | 6/1982 | Sahyun et al. | 430/11 |
| 4,489,122 | 12/1984 | Kammin et al. | 428/212 |
| 4,914,451 | 4/1990 | Morris et al. | 346/1.1 |

FOREIGN PATENT DOCUMENTS

| | | |
|---|---|---|
| 0238242 | 9/1987 | European Pat. Off. |
| 61-188185 | 8/1986 | Japan |
| 63-173295 | 7/1987 | Japan |
| 63-162286 | 7/1988 | Japan |
| 63-203382 | 8/1988 | Japan |

OTHER PUBLICATIONS

*Pressure-Fusing Behavior of Monocomponent Toners*, by S. K. Bhateja and J. R. Gilbert, 1985, pp. 267-272.

*Primary Examiner*—Patrick J. Ryan
*Attorney, Agent, or Firm*—Christif, Parker & Pale

[57] ABSTRACT

It has been found that improved toner adhesion and resistance from abrasion can be achieved by applying to the printing substrate, a polymeric film forming material suitable for forming a print-receptive coating which when cured, will have a dynamic storage tensile modulus ranging from about $0.01 \times 10^9$ to about $26 \times 10^9$ dynes per square centimeter when measured on a Rheometrics Mechanical Spectrometer at 25° C. at a frequency of 10 radians per second. At this modulus range the coating will have a softness to hardness range which will accept the printed toner without undue smearing and without allowing the toner to come loose from the coating during normal handling.

36 Claims, No Drawings

PRINT RECEIVING COATINGS

CROSS REFERENCE TO RELATED APPLICATION

This is a continuation-in-part of U.S. application Ser. No. 07/364,793 filed on June 9, 1989, now abandoned.

BACKGROUND OF THE INVENTION

Nonimpact printing is performed by application of a toner or other print medium, collectively referred to hereinafter as "toner," to a substrate such as by ion deposition printers, laser printers, Xerox brand type printers, ink jet printers and thermal transfer printers. A wide variety of substrates are used with such printing such as paper, plastics and vinyl.

The adhesion of the toner to such substrates is not entirely satisfactory. During normal handling, abrasions to the toner printed on substrates will cause portions to come loose, particularly toner printed with ion deposition printers where the toner is only pressure fused to the substrate. Laser printers and Xerox brand type printers provide for a little better adhesion because they fuse the toner to the substrate by pressure and heat.

A need exists to improve such adhesion and to make toners abrasion resistant. These objectives are the subject of the instant invention.

SUMMARY OF THE INVENTION

It has been found that improved toner adhesion and resistance from abrasion can be achieved, particularly for toners fused by pressure alone at room temperature. This improved adhesion is achieved by applying to the printing substrate a polymeric film forming material suitable for forming a print-receptive coating which when cured or dried will have a dynamic storage tensile modulus ranging from about $0.01 \times 10^9$ to about $26 \times 10^9$ dynes per square centimeter when measured on a Rheometrics Mechanical Spectrometer, model 800, at 25° C. at a frequency of 10 radians per second using the film fixture attachment. At this modulus range the coating will be soft enough to deform and accept the toner without undue smearing and without allowing the toner to come loose from the coating during normal handling, but without being so soft as to cause one sheet of paper to adhere to the next or jam when contacted by rollers in a printing machine.

While the print receptive coating can be beneficially applied to a wide variety of substrates, the preferred substrate will be a compressible substrate with the most preferred a porous, compressible substrate such as paper or a pressure sensitive label construction.

Virtually any polymeric film forming material may be used as a coating, provided that it is suitable for forming a print-receptive coating and has a modulus range as specified above, when cured or dried.

The polymeric film forming materials used to form the coating of the present invention may be prepared and applied to the substrate and cured or dried thereon using water based emulsions or organic solvent systems, or using 100% solids reactive systems which are cured by ultraviolet (UV) or electron beam radiation before transfer of the toner. The coating viscosity of the print receptive coating should be high enough to prevent undue soak into the most preferred porous substrate.

The coatings have utility as a surface for single cut sheets or for label face stock. They are particularly useful for printed bar codes in preventing the contact bar code reader from abrading off the bar code image and making the bar code unreadable.

Particular polymeric materials suitable for use in forming coatings of the 100% solids reactive system of the present invention are acrylated oligomers and mixtures therefore, and oligomers selected from the group consisting of acrylated urethane oligomers, acrylated epoxy oligomers and polyacrylic oligomers.

PREFERRED EMBODIMENTS

Exemplary formulations of polymeric materials suitable for forming print-receptive coating are set forth in Table I below.

TABLE I

| | Formulations in Weight Percent of Total Formation | | | | | | | | |
|---|---|---|---|---|---|---|---|---|---|
| | 1 | 2 | 3 | 4 | 5 | 6 | 7 | 8 | 9 |
| Ebecryl 4833 (Acrylated Urethane Oligomer) | 21.6 | 75.7 | — | 21.6 | 37.85 | 54.1 | 37.85 | — | — |
| Ebecryl 769 (Polyacrylic Oligomer) | 54.1 | — | — | — | 37.85 | 21.6 | — | 37.85 | 75.7 |
| Ebecryl 4883 (Urethane Acrylate Oligomer Acrylate Monomer Blend) | — | — | — | 54.1 | — | — | — | — | — |
| CMD-3703 (Acrylated Epoxy Oligomer) | — | — | 75.7 | — | — | — | 37.85 | 37.85 | — |
| N-Vinyl-2-Pyrrolidone (reactive diluent) | 17.4 | 17.4 | 17.4 | 17.4 | 17.4 | 17.4 | 17.4 | 17.4 | 17.4 |
| 2,2-diethoxyacetophenone (U.V. sensitizer) | 6.5 | 6.5 | 6.5 | 6.5 | 6.5 | 6.5 | 6.5 | 6.5 | 6.5 |
| Z-6040 (coupling agent) | 0.4 | 0.4 | 0.4 | 0.4 | 0.4 | 0.4 | 0.4 | 0.4 | 0.4 |
| | 100.0 | 100.0 | 100.0 | 100.0 | 100.0 | 100.0 | 100.0 | 100.0 | 100.0 |

Formulation 10 9 Parts Formulation #1 and 1 Part of a silica flatting agent OK412
Formulation 11 Joncryl 80 Acrylic Emulsion
Formulation 12 Rhoplex 1533 Acrylic Emulsion The dynamic storage tensile modulus, E', the dynamic tensile loss modulus E", and the loss tangent (tan d = E"/E'), of each formulation of Table I is set forth in Table II below wherein each cured formulation is ranked as its modulus increases from the softest coating, No. 12, to the hardest coating, No. 7.

Table II also sets forth the modulus of each formulation using a frequency of 10 and 100 Radians per second for the sake of comparison. It is believed that the time of 0.1 sec (corresponding to a frequency of 10 radians/sec) approximates the time that pressure is applied to any given toner particle during the fusing operation and that the coating modulus at that frequency is the important parameter for determining toner adhesion and abrasion resistance.

Ultraviolet curable coatings applied to a 20 pound per ream ion deposition grade bond paper manufactured by Boise Cascade Co. were cured with two 300 watt per inch medium pressure mercury vapor UV lamps. The coating viscosity at application ranged from 350-2500 cps. as measured by a Brookfield viscometer with a number 6 spindle at 100 RPM. Under these conditions, good surface coatings were provided onto the surface with no detrimental penetration into the porous sheet. Line speed was 70 feet/minute with the application to drying distance of 24 inches, giving a time to cure of 1.7 sec. All coatings had a surface energy greater than 30 dynes/cm$^2$. The ultraviolet curable coatings were applied by flexographic techniques, but other coating techniques known in the art may be utilized. The required weight of the coatings are from 0.5 to 5 grams/meter$^2$.

TABLE II

| Formulation | E'(@ 10R/S) × 10$^9$ Dynes/cm$^2$ | E'(@ 100R/S) × 10$^9$ Dynes/cm$^2$ | E"(@ 10R/S) × 10$^9$ Dynes/cm$^2$ | E"(@ 100R/S) × 10$^9$ Dynes/cm$^2$ | tan Z(@ 10R/S) | tan Z(@ 100R/S) |
|---|---|---|---|---|---|---|
| 12 | 0.3 | 1.2 | 0.33 | 1.16 | 1.10 | 0.97 |
| 9 | 0.9 | 1.0 | 0.28 | 0.40 | 0.31 | 0.40 |
| 11 | 2.2 | 2.5 | 0.24 | 0.23 | 0.11 | 0.09 |
| 1 | 5.9 | 9.1 | 1.89 | 2.36 | 0.32 | 0.26 |
| 5 | 6.2 | 9.1 | 1.72 | 2.21 | 0.28 | 0.24 |
| 10 | 7.6 | 10.7 | 2.20 | 2.68 | 0.29 | 0.25 |
| 6 | 8.5 | 11.2 | 1.79 | 1.95 | 0.21 | 0.17 |
| 4 | 8.7 | 11.1 | 1.53 | 1.63 | 0.18 | 0.15 |
| 8 | 10.2 | 13.0 | 1.50 | 1.96 | 0.15 | 0.15 |
| 2 | 14.1 | 17.0 | 1.93 | 1.90 | 0.14 | 0.11 |
| 3 | 21.2 | 22.4 | 0.74 | 0.85 | 0.04 | 0.04 |
| 7 | 25.9 | 28.6 | 2.10 | 2.17 | 0.08 | 0.08 |

Table III sets forth measurements of how well toner adheres to the coatings of the present invention. The coatings were applied to 20 pound bond paper as aforesaid. The toner was printed on said coated paper by fusing the toner thereon by pressure alone by a C. Itoh electronics model Megaline/30 printer using a Delphax engine S-3000 operating at room temperature using an alpha numeric test pattern as the image. No transport problems were experienced through this multiroll machine indicating excellent performance against jamming or blocking. The toner was Delphax Monocomponent Ion Deposition toner manufactured by Coates Special Products, Kent, England. An adhesive tape (Scotch 610) was applied to toner printed on a sheet of uncoated paper (the control) and to toner printed on eight sheets of coated paper having eight different coating formulations as set forth in Table I, with the results tabulated in Table III. The adhesive tape removed most of the toner from the uncoated paper but did not remove enough toner from the paper having coating formulations 1 to 8 to adversely affect their readability.

The amount of toner removed as aforesaid is measured in terms of its readability which is measured by a PCM II instrument manufactured by MacBeth Company. The PCM II instrument measures readability in terms of the print contrast, i.e., the reflectivity of the printed image relative to the reflectivity of the paper, to give print contrast readings as set forth in Table III and IV. Print contrast readings are reported in Tables III and IV as 100 times the decimal reading of the instrument, i.e., as a percentage figure. The PCM II has a 0.008 inch reading diameter. The measurements were an average of 5 to 7 readings taken at the intersection of the horizontal and vertical sections of letters such as "B" and "E". Print contrast readings of 70% or above are generally readable.

The Print Contrast measurements set forth in Tables III and IV were made with the PCM II instrument using a "C" filter with a 3050 K source. The "C" filter has a response range of from about 639 nm to about 1110 nm and a central peak response at 800 nm wavelength.

TABLE III

| | E' × 10$^9$ in Dynes/cm$^2$ at 25° C. | | Print Contrast Reading of Sheets Imaged by Ion Deposition (%) | |
|---|---|---|---|---|
| Formulation | @ 10 Radians/ Second | @ 100 Radians/ Second | Paper Sheet with Toner | Paper Sheet After Partial Removal of Toner with Tape |
| Control | | | 95.9 | 15.6 |
| (paper with no coating) | | | | |
| 1 | 5.9 | 9.1 | 95.8 | 94.5 |
| 5 | 6.2 | 9.1 | 96.8 | 95.1 |
| 6 | 8.5 | 11.2 | 96.4 | 94.5 |
| 4 | 8.7 | 11.1 | 95.9 | 88.6 |
| 8 | 10.2 | 13.0 | 96.6 | 89.3 |
| 2 | 14.1 | 17.0 | 95.6 | 93.0 |
| 3 | 21.2 | 22.4 | 96.5 | 70.5 |
| 7 | 25.9 | 28.6 | 96.0 | 86.8 |

Table IV sets forth measurements made with the PCM II using a different alphanumeric test pattern as the image.

TABLE IV

| Formulation | Print Contrast Reading Before Tape (%) | Print Contrast Reading After Tape (%) |
|---|---|---|
| Uncoated Paper (Control) | 93 | 56 |
| 1 | 94 | 91 |
| 2 | 94 | 90 |
| 6 | 94 | 89 |
| 7 | 94 | 89 |
| 8 | 93 | 88 |
| 9 | 93 | 87 |
| 10 | 93 | 89 |
| 11 | 95 | 90 |
| 12 | 94 | 88 |

Ebecryl 4833 is the trade name of an acrylated urethane oligomer used in the present invention, and is marketed by Radcure Specialties of Norfolk, Virginia.

Ebecryl 4833 is prepared by reacting a isocyanide with a polyester polyol to obtain a urethane backbone which is reacted with acrylic acid to produce an acrylated urethane oligomer. The acrylated urethane oligomer used in the present invention has a molecular weight of about 1,500, and functionality of 2. This oligomer constitutes about 90% by weight of solids, the remainder being a diluting reactive monomer, N-vinyl-2-pyrrolidone. This oligomer, including the diluting monomer, has an acid number between 0–3, a color between 1–3, and a viscosity in centerpoise of 1670–2670 at 140° F. and 775–1175 at 160° F. The weight per gallon is 9.2–9.4 pounds.

Ebecryl 769 is the trade name of a polyacrylic oligomer used in the present invention, and is sold by Radcure Specialties of Norfolk, Virginia. Ebecryl 769 is a blend comprising about 74% by weight of polyacrylic oligomer, about 26% by weight of isobornyl acrylate. This blend has the following characteristics: A specific gravity of 1.06, a vapor pressure of less than 0.1 in millimeters of mercury, a volatility of less than 0.3 by weight, an evaporation rate of less than 1, with the evaporation rate of butyl acetate being 1, and a lack of solubility in water.

Ebecryl 4883 used in the present invention is a blend of about 85% by weight of urethane acrylate oligomer and about 15% by weight of an acrylate monomer tripropylene glycol diacrylate. It is sold by Radcure, Inc. of Port Washington, Wisconsin. This blend has a vapor pressure of less than 0.1 millimeters of mercury, a molecular weight of about 1500, a specific gravity of about 1.10, a volatility of less than 0.3 by weight, and an evaporation rate of less than 1, with the evaporation of butyl acetate being 1.

CMD 3703 used in the present invention is the trade name of an acrylated epoxy oligomer, marketed by Radcure, Inc., as above, and more specifically is a diacrylate ester of an amine-modified bispheonol A type epoxy resin with 5% added hydroxypropyl acrylate. It has a viscosity at 65° C. of 2,000 cps., a Gardner color of 3 to 4, an acid value of 3, a theoretical molecular weight of 834 and a theoretical functionality of 2.

A variety of reactive diluents may be used with the present invention, exemplary of which are N-vinyl-2-pyrrolidone;trimethylolpropanetriacrylate;1,6 hexanediol diacrylate; diethylene glycol diacrylate and vinyl acetate (not greater than 15%).

A variety of photoinitiators may be used with the present invention, exemplary of which are 2,2-diethoxyacetophenone, N-methyldiethanolamine and benzophenone, all of which are manufactured by the UpJohn Company of North Haven, Connecticut.

Z6040 is the trade name of silane coupling agent manufactured by Dow Corning Co. of Midland, Michigan, and used with the present invention. It has a specific gravity of 1.070 and a viscosity at 25.C of 3 c St.

Joncryl 80 used in the present invention is the trademark of S. C. Johnson & Son, Inc. of Racine, Wisconsin, for a milky appearing dispersion of an acrylic polymer used for adhesion to polyolefins and foil and having the following physical characteristics: a viscosity of 400 cps, a weight of 8.7 pounds per gallon, and a pH of 8.3.

Rhoplex AC - 1533 is the trademark of Rohm & Haas Co., of Philadelphia, PA, for a hydroxyl functional acrylic emulsion polymer having the following physical properties: a solids content of 46% to 47%, a pH of 8.6 to 9.2, a density of 8.8 lbs/U.S. gal. (wet) and 9.43 lbs/gal. (dry), $N_1N_1$ dimenthylaminoethanol, as a neutralizing amine, a minimum film forming temperature of 21° C., and Tukon hardness (KHN) of 6 to 7.

Flatting agent OK 412 is the trademark of the Degussa Company for a finely divided silica having a $SiO_2$ content of 99%, a pH of 6 of a 4% aqueous suspension, a tapped density of 120 g/l, a specific gravity of 1.9, a refractive index of 1.45, and an average particle size of 3 lm.

Excess gloss given to the paper from the pressure fusing may be considered detrimental. In that case, suitable amounts of flatting agents such as silica can be added to reduce the gloss of the coating as illustrated in Table V. The measurements of gloss in Table V were made with a Gardner GG - 9095 multi-angle glossmeter. Formulation No. 10 in Table V is identical to formulation No. 1 except for the addition of a silica.

TABLE V

| Formulation | 45° GLOSS | | 60° GLOSS | | 75° GLOSS | |
|---|---|---|---|---|---|---|
| | Before Imaging | After Imaging | Before Imaging | After Imaging | Before Imaging | After Imaging |
| Control | 6 | 8 | 4 | 7 | 6 | 13 |
| No. 1 | 10 | 11 | 10 | 11 | 20 | 24 |
| No. 10 | 6 | 7 | 4 | 7 | 7 | 14 |

While the embodiments of the invention chosen herein for purposes of the disclosure are at present considered to be preferred, it is to be understood that this invention is intended to cover all changes and modifications in all the disclosed embodiments which fall within the spirit and scope of the invention.

What is claimed is:

1. A print receptive polymeric film forming material suitable for coating a substrate for use in nonimpact printing of a toner fused by pressure alone, said coating, when cured or dried, having a dynamic storage tensile modulus ranging from about $0.01 \times 10^9$ to abut $26 \times 10^9$ dynes per square centimeter when measured on a Rheometrics Mechanical Spectrometer at 25° C. at a frequency of 10 radians per second.

2. A polymeric film forming material as set forth in claim 1 wherein said film forming material is applied to said substrate as an aqueous solution.

3. A polymeric film forming material as set forth in claim 1 having a flatting agent.

4. A print receptive coating on a substrate for use in nonimpact printing, said coating comprising cured acrylated oligomer having a dynamic storage tensile modulus ranging from about $0.01 \times 10^9$ to about $26 \times 10^9$ dynes per square centimeter when measured on a Rheometrics Mechanical Spectrometer at 25° C. at a frequency of 10 radians per second said coating being receptive to toner fused by pressure alone.

5. A print receptive coating as set forth in claim 4 having a flattening agent.

6. A print receptive cured coating on a substrate for use in non-impact printing in which toner is applied and fused by pressure alone said cured coating comprising suitable amounts of:
   an oligomer selected from the group consisting essentially of acrylated urethane oligomers; acrylated epoxy oligomers, and polyacrylic oligomers;
   said cured coating, having a dynamic storage tensile modulus ranging from about $0.01 \times 10^9$ to about $26 \times 10^9$ dynes per square centimeter when measured on a Rheometrics Mechanical Spectrometer at 25° C. at a frequency of 10 radians per second.

7. A print receptive cured coating on a substrate printed by non-impact printing, of toner fused by pressure alone, said coating comprising suitable amounts of an oligomer selected from the group consisting of acrylated urethane oligomers, acrylated epoxy oligomers, and polyacrylic oligomers; a reactive diluent; and a photoinitiator; said cured coating, having a dynamic storage tensile modulus of elasticity ranging from about $0.01 \times 10^9$ to abut $26 \times 10^9$ dynes per square centimeter when measured on a Rheometrics Mechanical Spectrometer at 25° C. at a frequency of 10 radians per second.

8. A print-receptive coating as set forth in claims 6 or 7 wherein said acrylated urethane oligomers range from about 20% to 80% by weight, said acrylated epoxy oligomers range from about 30% to about 80% by weight, and said polyacrylic oligomers range from about 20% to bout 60% by weight of the total coating.

9. A print-receptive coating provided on a substrate for use in non-impact printing of toner fused by pressure alone, said coating comprising an ultraviolet radiation cured blend of:
   about 20% by weight of a acrylated urethane oligomer;
   about 55% by weight of a polyacrylic oligomer; and
   suitable amounts of a reactive diluent selected from the group consisting of N-vinyl-2-pyrrolidone, trimethylolpropane triacrylate, 1,6 hexanediol diacrylate, diethylene glycol diacrylate and vinyl acetate and a photoinitiator.

10. A print-receptive coating provided on a substrate for use in non-impact printing of toner fused by pressure alone, said coating comprising an ultraviolet radiation cured blend of:
    about 80% by weight of a acrylated urethane oligomer; and
    suitable amounts of a reactive diluent selected from the group consisting of N-vinyl-2-pyrrolidone, trimethylolpropane triacrylate, 1,6 hexanediol diacrylate, diethylene glycol diacrylate and vinyl acetate and a photoinitiator.

11. A print-receptive coating provided on a substrate for use in non-impact printing of toner fused by pressure alone, said coating comprising an ultraviolet radiation cured blend of:
    about 80% by weight of a acrylated epoxy oligomer, and
    suitable amounts of a reactive diluent selected from the group consisting of N-vinyl-2-pyrrolidone, trimethylolpropane triacrylate, 1,6 hexanediol diacrylate, diethylene glycol diacrylate and vinyl acetate and a photoinitiator.

12. A print-receptive coating provided on a substrate for use in non-impact printing of toner fused by pressure alone, said coating comprising an ultraviolet radiation cured blend of:
    about 20% by weight of a acrylated urethane oligomer, diluted by N-vinyl-2-pyrrolidone;
    about 55% by weight of a urethane acrylate oligomer and acrylate monomer blend where the acrylate monomer is tripropylene glycol diactrolate; and
    suitable amounts of a reactive diluent selected from the group consisting of trimethylolpropane triacrylate, 1,6 hexanediol diacrylate, diethylene glycol diacrylate and vinyl acetate and a photoinitiator.

13. A print-receptive coating provided on a substrate for use in non-impact printing of toner fused by pressure alone, said coating comprising an ultraviolet radiation cured blend of:
    about 40% by weight of a acrylated urethane oligomer;
    about 40% by weight of a polyacrylic oligomer; and
    suitable amounts of a reactive diluent selected from the group consisting of N-vinyl-2-pyrrolidone, trimethylolpropane triacrylate, 1,6 hexanediol diacrylate, diethylene glycol diacrylate and vinyl acetate and a photoinitiator.

14. A print-receptive coating provided on a substrate for use in non-impact printing of toner fused by pressure alone, said coating comprising an ultraviolet radiation cured blend of:
    about 55% by weight of a acrylated urethane oligomer;
    about 20% by weight of a polyacrylic oligomer, and
    suitable amounts of a reactive diluent selected from the group consisting of N-vinyl-2-pyrrolidone, trimethylolpropane triacrylate, 1,6 hexanediol diacrylate, diethylene glycol diacrylate and vinyl acetate and a photoinitiator.

15. A print-receptive coating provided on a substrate for use in non-impact printing of toner fused by pressure alone, said coating comprising an ultraviolet radiation cured blend of:
    about 40% by weight of a acrylated urethane oligomer;
    about 40% by weight of a acrylated epoxy oligomer; and
    suitable amounts of a reactive diluent selected from the group consisting of N-vinyl-2-pyrrolidone, trimethylolpropane triacrylate, 1,6 hexanediol diacrylate, diethylene glycol diacrylate and vinyl acetate and a photoinitiator.

16. A print-receptive coating provided on a substrate for use in non-impact printing of toner fused by pressure alone, said coating comprising an ultraviolet radiation cured blend of:
    about 40% by weight of a polyacrylic oligomer,
    about 40% by weight of a acrylated epoxy oligomer, and
    suitable amounts of a reactive diluent selected from the group consisting of N-vinyl-2-pyrrolidone, trimethylolpropane triacrylate, 1,6 hexanediol diacrylate, diethylene glycol diacrylate and vinyl acetate and a photoinitiator.

17. A substrate having thereon a cured polymeric coating which is receptive to printed toner fused by pressure alone, said polymeric coating having a dynamic storage tensile modulus ranging from about $0.01 \times 10^9$ to about $26 \times 10^9$ dynes per square centimeter when measured on a Rheometrics Mechanical Spectrometer at 25° C. at a frequency of 10 radians per second said coating being applied at about a coat weight of from 0.5 to 5 grams/meter$^2$.

18. A substrate as set forth in claim 17 wherein said substrate is pressure sensitive label stock.

19. A substrate as set forth in claim 17 wherein said substrate is paper.

20. A substrate as set forth in claim 17 wherein said substrate is vinyl.

21. A substrate as set forth in claim 17 wherein said substrate is plastic.

22. A substrate as set forth in claim 17 wherein said polymeric coating is applied to a substrate which is a pressure sensitive label stock, and the print is applied to said coated substrate by ion deposition printing.

23. A substrate having thereon a cured coating which is respective to printed toner fused by pressure alone, said coating comprising an acrylated oligomer or mixture thereof, and having a dynamic storage tensile modulus ranging from about $0.01 \times 10^9$ to abut $26 \times 10^9$ dynes per square centimeter when measured on a Rheometrics Mechanical Spectrometer at 25° C. using a frequency of 10 radians per second said coating being applied at a coat weight of from 0.5 to 5 grams/meter$^2$.

24. A substrate as set forth in claim 17 wherein said substrate is applied to said substrate as an aqueous emulsion.

25. A substrate as set forth in claim 23 wherein said coating includes a flattening agent therein.

26. A substrate having a cured print-receptive coating receptive to printed toner fused by pressure alone, said coating comprising:
   an oligomer selected from the group consisting essentially of acrylated urethane oligomers; acrylated epoxy oligomers, and polyacrylic oligomers;
   said coating when cured, having a dynamic storage tensile modulus ranging from about $0.01 \times 10^9$ to about $26 \times 10^9$ dynes per square centimeter when measured on a Rheometrics Mechanical Spectrometer at 25° C. using a frequency of 10 radians per second said coating being applied at a coat weight of from 0.5 to 5 grams/meter$^2$.

27. A substrate having a cured coating receptive to printed toner fused by pressure alone, said coating comprising suitable amounts of an oligomer selected from the group consisting of acrylated urethane oligomers; acrylated epoxy oligomers, and polyacrylic oligomers; a reactive diluent; and a photoinitiator; said cured coating having a dynamic storage tensile modulus of elasticity ranging from about $0.01 \times 10^9$ to about $26 \times 10^9$ dynes per square centimeter when measured on a Rheometrics Mechanical Spectrometer at 25° C. using a frequency of 10 radians per second said coating being applied at a coat weight of from 0.5 to 5 grams/meter$^2$.

28. A substrate having a cured print-receptive coating as set forth in claims 26 or 27 wherein said acrylated urethane oligomers range from about 20% to about 80% by weight, said acrylated epoxy oligomers range from about 30% to about 80% by weight, and said polyacrylic oligomers range from about 20% to about 60% by weight of the total coating.

29. A substrate having a cured print-receptive coating, said coating comprising:
   about 20% by weight of an acrylated urethane oligomer,
   about 55% by weight of a polyacrylic oligomer, and
   suitable amounts of a reactive diluent and a photoinitiator and receptive to printing of toner fused by pressure alone said coating being applied at a coat weight of from 0.5 to 5 grams/meter$^2$.

30. A substrate having a cured print-receptive coating, said coating comprising:
   about 80% by weight of an acrylated urethane oligomer, and
   suitable amounts of a reactive diluent and a photoinitiator and receptive to printing of toner fused by pressure alone said coating being applied at a coat weight of from 0.5 to 5 grams/meter$^2$.

31. A substrate having a cured print-receptive coating, said coating comprising:
   about 80% by weight of a acrylated urethane oligomer and
   suitable amounts of a reactive diluent and a photoinitiator and receptive to printing of toner fused by pressure alone said coating being applied at a coat weight of from 0.5 to 5 grams/meter$^2$.

32. A substrate having a cured print-receptive coating, said coating comprising:
   about 20% by weight of an acrylated urethane oligomer,
   about 55% by weight of a polyacrylic oligomer, and
   suitable amounts of a reactive diluent and a photoinitiator and receptive to printing of toner fused by pressure alone said coating being applied at a coat weight of from 0.5 to 5 grams/meter$^2$.

33. A substrate having a cured print-receptive coating, said coating comprising:
   about 40% by weight of an acrylated urethane oligomer,
   about 40% by weight of a polyacrylic oligomer, and
   suitable amounts of a reactive diluent and a photoinitiator and receptive to printing of toner fused by pressure alone said coating being applied at a coat weight of from 0.5 to 5 grams/meter$^2$.

34. A substrate having a cured print-receptive coating, said coating comprising:
   about 55% by weight of an acrylated urethane oligomer,
   about 20% by weight of a polyacrylic oligomer, and
   suitable amounts of a reactive diluent and a photoinitiator and receptive to printing of toner fused by pressure alone.

35. A substrate having a cured print-receptive coating, said coating comprising:
   about 40% by weight of an acrylated urethane oligomer,
   about 40% by weight of a polyacrylic oligomer, and
   suitable amounts of a reactive diluent and a photoinitiator said coating receptive to printing of toner fused by pressure alone and applied at a coat weight of from 0.5 to 5 grams/meter$^2$.

36. A substrate having a cured print-receptive coating, said coating comprising:
   about 40% by weight of a polyacrylic oligomer,
   about 40% by weight of a acrylated epoxy oligomer; and
   suitable amounts of a reactive diluent and a photoinitiator said coating receptive to printing of toner fused by pressure alone and applied at a coat weight of from 0.5 to 5 grams/meter$^2$.

* * * * *

UNITED STATES PATENT AND TRADEMARK OFFICE
CERTIFICATE OF CORRECTION

PATENT NO. : 5,102,737

DATED : April 7, 1992

INVENTOR(S) : Karl Josephy; George Q. Moses; Elisea Amba; Bruce D. Morrison

It is certified that error appears in the above-identified patent and that said Letters Patent is hereby corrected as shown below:

On the title page:

[56] References Cited, FOREIGN PATENT DOCUMENTS, please insert the following reference:

-- 62173295  7/1987  Japan --.

Column 2, line 27, change "therefore" to -- thereof --.
Column 2, line 33, change "coating" to -- coatings --.
Column 2, lines 57,58, change "tan d=E"/E'" to
    -- tan $\delta$=E"/E' --.
Column 3, line 24, change "tan Z@" to -- tan $\delta$@ --
    (both occurrences).
Column 5, line 1, after "reacting" change "a" to -- an --.
Column 5, line 38, change "bispheonol" to -- bisphenyl --.
Column 5, line 45, change "1,6 hexane-" to
    -- 1,6-hexane- --.
Column 6, line 8, change "lm" to -- $\mu$m --.

Column 6, line 44, change "solution" to -- emulsion --.
Column 7, line 9, change "109" to -- $10^9$ --.
Column 7, line 18, change "bout" to -- about --.
Column 7, line 23, before "acrylated" change "a" to
    -- an --.
Column 7, line 28, change "1,6 hexanediol" to
    -- 1,6-hexanediol --.

UNITED STATES PATENT AND TRADEMARK OFFICE
CERTIFICATE OF CORRECTION

PATENT NO. : 5,102,737

DATED : April 7, 1992

INVENTOR(S) : Karl Josephy; George Q. Moses; Elisea Amba; Bruce D. Morrison

It is certified that error appears in the above-identified patent and that said Letters Patent is hereby corrected as shown below:

Column 7, line 35, before "acrylated" change "a" to -- an --.
Column 7, line 39, change "1,6 hexanediol" to -- 1,6-hexanediol --.
Column 7, line 46, before "acrylated" change "a" to -- an --.
Column 7, line 50, change "1,6 hexanediol" to -- 1,6-hexanediol --.
Column 7, line 57, nefore "acrylated" change "a" to -- an --.
Column 7, line 61, change "diactrolate" to -- diacrylate --.
Column 7, line 64, change "1,6 hexanediol" to -- 1,6-hexanediol --.
Column 8, line 3, before "acrylated" change "a" to -- an --
Column 8, line 8, change "1,6 hexanediol" to -- 1,6-hexanediol --.
Column 8, line 15, before "acrylated" change "a" to -- an --.
Column 8, line 20, change "1,6 hexanediol" to -- 1,6-hexanediol --.
Column 8, lines 27,29, before "acrylated" change "a" to -- an -- (both occurrences).
Column 8, line 33, change "1,6 hexanediol" to -- 1,6-hexanediol --.
Column 8, line 41, before "acrylated" change "a" to -- an --.
Column 8, line 45, change "1,6 hexanediol" to -- 1,6-hexanediol --.

UNITED STATES PATENT AND TRADEMARK OFFICE
CERTIFICATE OF CORRECTION

PATENT NO. : 5,102,737

DATED : April 7, 1992

INVENTOR(S) : Karl Josephy; George Q. Moses; Elisea Amba; Bruce D. Morrison

It is certified that error appears in the above-identified patent and that said Letters Patent is hereby corrected as shown below:

```
Column 9, line 2, change "respective" to -- receptive --.
Column 9, line 5, change "abut" to -- about --.
Column 9, line 5, change "109" to -- 10⁹ --.
Column 9, line 11, change "substrate" to -- coating --.
Column 9, line 54, change "reactive" to -- receptive --.
Column 10, line 9, before "acrylated" change "a" to
           -- an --.
Column 10, line 20, change "reactive" to -- receptive --.
Column 10, line 29, change "reactive" to -- receptive --.
Column 10, line 38, change "reactive" to -- receptive --.
Column 10, line 46, change "reactive" to -- receptive --.
Column 10, line 53, before "acrylated" change "a" to
           -- an --.
```

Signed and Sealed this

Twenty-first Day of September, 1993

Attest:

BRUCE LEHMAN

*Attesting Officer*            *Commissioner of Patents and Trademarks*